US012235612B2

(12) United States Patent
Gimkiewicz

(10) Patent No.: US 12,235,612 B2
(45) Date of Patent: Feb. 25, 2025

(54) DEWAR DEVICE COMPRISING A TRANSPARENT EXTERNAL ELEMENT

(71) Applicant: OMEGA SA, Biel/Bienne (CH)

(72) Inventor: Christiane Gimkiewicz, Ismaning (DE)

(73) Assignee: OMEGA SA, Biel/Bienne (CH)

( * ) Notice: Subject to any disclaimer, the term of this patent is extended or adjusted under 35 U.S.C. 154(b) by 369 days.

(21) Appl. No.: 17/858,171

(22) Filed: Jul. 6, 2022

(65) Prior Publication Data

US 2023/0017243 A1 Jan. 19, 2023

(30) Foreign Application Priority Data

Jul. 16, 2021 (EP) .................................... 21186201

(51) Int. Cl.
*G04B 43/00* (2006.01)
*G04B 37/02* (2006.01)
*G04B 37/04* (2006.01)

(52) U.S. Cl.
CPC ........... *G04B 43/005* (2013.01); *G04B 37/02* (2013.01); *G04B 37/04* (2013.01)

(58) Field of Classification Search
CPC ....... G04B 43/005; G04B 37/04; G04B 37/02
See application file for complete search history.

(56) References Cited

U.S. PATENT DOCUMENTS 2,849,854 A * 9/1958 Pfisterer ............... G04B 37/055 368/287
3,030,763 A * 4/1962 Klingenberg .......... G04B 37/02 368/291
3,740,944 A * 6/1973 Chopard .............. G04B 43/005 368/286
11,947,319 B2 * 4/2024 Perruchoud .......... G04B 43/005
12,078,968 B2 * 9/2024 Franzi .................... G04B 37/04
2009/0297851 A1 12/2009 Frage et al.
2020/0262740 A1 * 8/2020 Borges-Machado ......................... C03C 14/006

FOREIGN PATENT DOCUMENTS

EP 3 835 884 A1 6/2021
EP 3835891 A1 6/2021
JP 62-93788 U 6/1987

(Continued)

OTHER PUBLICATIONS

Excerpt from Wikipedia article “Sintering”, https://en.wikipedia.org/wiki/Sintering, archived by the Internet Archive Nov. 14, 2020 (Year: 2020).*

(Continued)

*Primary Examiner* — Edwin A. Leon
*Assistant Examiner* — Sean R Brannon
(74) *Attorney, Agent, or Firm* — Sughrue Mion, PLLC

(57) ABSTRACT

A Dewar device (1) for mechanical and/or functional components (2) of a watch (3), the device (1) being provided with a bracelet and a casing (4) including an enclosure (5) in which a case (6) of the watch (3) is capable of being arranged and at least one fastening device (7) fastening the case (6) of the watch (3) inside the enclosure (5) of the casing (4) while keeping it away from the set of elements (10*a*, 10*b*, 10*c*) of the casing (4) defining this enclosure (5), the set (10*a*, 10*b*, 10*c*) including at least one transparent external element (10*a*) made of a transparent ceramic material, in particular a transparent polycrystalline ceramic material.

13 Claims, 1 Drawing Sheet

(56) References Cited

FOREIGN PATENT DOCUMENTS

| | | | |
|---|---|---|---|
| JP | 6-144925 | A | 5/1994 |
| JP | 2000-75053 | A | 3/2000 |
| WO | 2011/038680 | A1 | 4/2011 |
| WO | 2015/055824 | A1 | 4/2015 |

OTHER PUBLICATIONS

Excerpt from Wikipedia article "Transparent Ceramics", https://en.wikipedia.org/wiki/Transparent_ceramics, archived by the Internet Archive Oct. 26, 2020 (Year: 2020).*
Excerpt from Wikipedia article "Vickers hardness test", https://en.wikipedia.org/wiki/Vickers_hardness_test (Year: 2024).*
Excerpt from Stanford Advanced Materials "Yttrium Aluminum Garnet Transparent Ceramic Specification", https://www.samaterials.com/ceramic-material/2470-yttrium-aluminium-garnet-transparent-ceramic.html (Year: 2024).*
European Search Report of EP 21 18 6201 dated Nov. 25, 2021.
Communication dated Jul. 11, 2023 issued by the Japanese Patent Office in application No. 2022-103265.

* cited by examiner

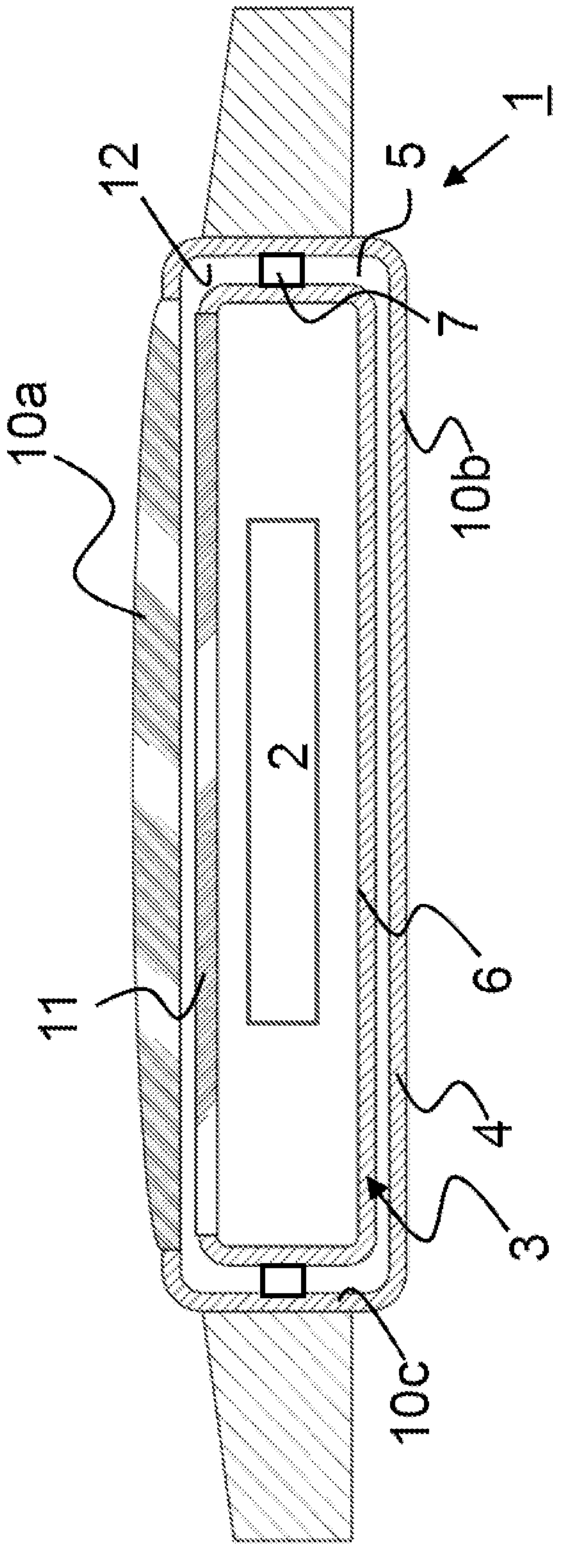
1
5
12
7
10a
10b
2
6
11
4
3
10c

DEWAR DEVICE COMPRISING A TRANSPARENT EXTERNAL ELEMENT

CROSS REFERENCE TO RELATED APPLICATIONS

This application is claiming priority based on European Patent Application No. 21186201.6 filed on Jul. 16, 2021, the disclosure of which is incorporated herein in its entirely by reference.

TECHNICAL FIELD OF THE INVENTION

The present invention relates to a Dewar device for mechanical and/or functional components of a watch, the device comprising a transparent external element.

TECHNOLOGICAL BACKGROUND

A watch, such as an electronic watch for example, conventionally comprises a bracelet and a watch case including a plurality of electrical or electronic components. It is known in the prior art that some of these components do not withstand extreme temperatures, and cease to function properly at these temperatures. Typically, liquid crystal displays (LCDs) using light-emitting diodes or quartz crystals tolerate temperatures of up to about 80° C. (degrees Celsius), and down to 0° C. However, in special environments such as that of space or lunar missions for example, temperatures can often reach values of substantially around −150° C. to +125° C.

There is thus a need to be able to use a watch, in particular an electronic watch, in environments where such extreme temperatures may prevail.

SUMMARY OF THE INVENTION

The invention relates to a Dewar device for mechanical and/or functional components of a watch, said device being provided with a bracelet and a casing including an enclosure in which a case of said watch is capable of being arranged and at least one fastening device fastening said watch case inside said enclosure of the casing while keeping it away from the set of elements of the casing defining this enclosure, said set comprising at least one transparent external element made of a transparent ceramic material, in particular a transparent polycrystalline ceramic material.

According to other embodiments:

- said at least one transparent external element is made of a ceramic material containing essentially aluminium oxynitride;
- said at least one transparent external element is made of a ceramic material containing essentially alumina-magnesia;
- said at least one transparent external element is made of a ceramic material containing essentially yttrium oxide;
- said at least one transparent external element is made of a ceramic material containing essentially yttrium aluminium garnet;
- said at least one transparent external element is made by sintering a rough part, the overall shape whereof is similar to that of said external element, said rough part being formed essentially from a powder or a mixture of powders of ceramic material containing essentially aluminium oxynitride, alumina-magnesia, yttrium oxide and/or yttrium aluminium garnet;

- said at least one transparent external element has a Vickers hardness number comprised between 1,223 and 1,632 $kgf.mm^{-2}$ and preferably of 1,530 $kgf.mm^{-2}$;
- said at least one transparent external element has a light transmittance in the visible spectrum of about 85% for a thickness of about 2 mm;
- the external element has a light absorption coefficient in the visible spectrum of no more than 65% after sintering and polishing;
- said at least one transparent external element is a crystal whose surface is substantially larger or strictly larger than a crystal of the watch case;
- a crystal of the watch case is disposed facing a crystal of the casing when the watch case is arranged in said enclosure;
- said enclosure is under vacuum or near vacuum;
- said at least one fastening device is arranged on an inner peripheral wall of the enclosure of the casing, and
- the device comprises an interferometric filter arranged on an overall external face of the casing.

BRIEF DESCRIPTION OF THE FIGURES

Other features and advantages will become clear upon reading the description given hereinbelow as a rough guide and in no way as a limiting guide, with reference to FIG. 1 which is a sectional view of a diagrammatic representation of a Dewar device for mechanical and/or functional components of a watch provided with a transparent external element such as a crystal, according to one embodiment of the invention.

DETAILED DESCRIPTION OF THE INVENTION

FIG. 1 shows a diagrammatic view of an isothermal horological device 1 for mechanical and/or functional components 2 of a watch 3 such as a mechanical watch, an electronic watch or a hybrid watch. This isothermal horological device 1 is also referred to as a “Dewar horological device”, or simply as a “Dewar device” in the description hereinbelow. Such a Dewar device 1 is capable of participating in particular in providing good thermal insulation to mechanical and/or functional components 2 of the watch 3, the case 6 whereof is arranged inside the casing 4 of this device 1.

This Dewar device 1 comprises at least one transparent external element **10*a*, such as a crystal/glass or a back. As will be seen hereinbelow, such a transparent external element 10*a* is made of a material which simultaneously has good mechanical and thermal properties and is resistant to radiation and damage caused by various acids, bases and water, as well as having good transparency. This external element 10*a*** is made of a transparent material that is capable of resulting in a transmission, evaluated by the transmittance Y, of greater than or equal to 68%, or even of greater than or equal to 85%, of light radiation at least comprising visible wavelengths. The term “transparent material” is understood herein to mean a material whose nature, combined with the thickness used, allows for at least partial transmission of the aforementioned light radiation.

Such an external element **10*a* is made of a transparent, refractory, ceramic material, in particular a transparent polycrystalline ceramic material. This material can consist of the following elements: aluminium oxynitride, alumina-magnesia, yttrium oxide or yttrium aluminium garnet, or a combination of two or more of these elements. More particularly, this external element is manufactured by sintering a rough part, the overall shape whereof is similar to that of the external element 10***a*. The rough part is essentially formed from a powder or a mixture of powders of ceramic material and, where appropriate, a binder, which after sintering and polishing has transparency characteristics in the visible spectrum. This powder or mixture of powders essentially comprises the transparent ceramic material essentially containing aluminium oxynitride, alumina-magnesia, yttrium oxide and/or yttrium aluminium garnet of aluminium oxynitride. This powder or the mixture of powders can of course, where appropriate, contain a certain number of additives in small quantities in order to obtain parts with specific properties. These additives and the effects thereof are well known to a person skilled in the art.

The external element 10*a* thus produced is of course completely transparent in the visible spectrum after sintering and helps to protect the case 6 of the watch 3 which is arranged inside the enclosure 5 of the casing 4 and in particular the mechanical and/or functional components 2 contained in this case 6.

This external element 10*a,* such as the crystal 10*a,* can be made, for example, according to the manufacturing method described in the French patent No. 2'556'711 which uses, as a starting material, a mixture of powders of ceramic material essentially containing aluminium oxynitride, alumina-magnesia, yttrium oxide and/or yttrium aluminium garnet.

For example, when the ceramic material contains essentially aluminium oxynitride, the composition of this external element is as follows: Al23-1/xO27+xN5-x, where x is comprised between 0.429 and 2.

Such an external element has a Vickers hardness number comprised between 1,223 and 1,632 kgf.mm$^{-2}$ and preferably of 1,530 kgf.mm$^{-2}$.

Furthermore, the transmittance thereof for light in the visible spectrum, which is a function of the reflection and absorption of this light, is approximately 85% for a thickness of about 2 mm.

This external element has a light absorption coefficient in the visible spectrum of no more than 65% after sintering and polishing.

Moreover, this transparent external element has, compared to transparent external elements of the prior art made of quartz glass, sapphire glass or plastic glass:

- a very good resistance to potential so-called brittle fractures, without plastic deformation:
- very good chemical resistance;
- very good thermal resistance with a high melting point;
- very good radiation hardening.

The Dewar device 1 described here is in particular formed by the combination of its casing 4 and the case 6 of the watch 3 in order to procure suitable thermal insulation for these mechanical and/or functional components 2. In this configuration, the case 6 of the watch 3 is arranged inside an enclosure 5 of the casing 4, while being kept away from or at a distance from the set of elements 10*a* to 10*c* of the casing 4 defining said enclosure 5, i.e. the external element such as the crystal 10*a,* an inner peripheral wall 12 of a middle 10*c* and a back 10*b* of this casing 4. It should be noted that this inner peripheral wall 12 is also that of said enclosure 5.

This distancing, spacing or separation is configured based on at least one fastening device 7 for fastening the case 6 of the watch 3 inside the casing 4. In other words, the fastening device 7 is capable of configuring a separation between said case 6 and the set of elements 10*a,* 10*b,* 10*c* of the casing 4 forming said enclosure 5 of this casing 4. This fastening device 7 helps to reduce or even eliminate any heat conduction between the inner peripheral wall 12*a* of the middle 10*c* and/or the back 10*b* and/or the crystal 10*a* with the case 6 of the watch 3, in particular with an overall external face of this case 6. This overall external face includes a top face comprising the crystal 11 of the case 6 of this watch 3, a bottom face comprising a back of said case 6 and an external peripheral wall of a middle of this case 6. It is understood that the bottom and top faces are opposite one another. It should be noted that the fastening device 7 is arranged on an inner peripheral wall 12 of the enclosure of the casing 4. In this configuration, the fastening device 7 mechanically connects, in particular in a reversible manner, the case 6 of the watch 3 to the inner peripheral wall 12 of the enclosure of the casing 4. Moreover, the Dewar device 1 can comprise two fastening devices 7 arranged within the enclosure opposite one another.

It should be noted that such a case 6 is comprised in a watch 3 which can be an electronic watch, for example a quartz watch, or a mechanical watch.

The mechanical and/or functional components 2 of the watch 3, mentioned hereinabove, comprise, in a non-limiting and non-exhaustive manner: a horological movement, a dial, hands, rings, gaskets and/or electronic and/or electrical components 2. It should be particularly noted that such electronic and/or electrical components 2 include, for example, a display device, a processor, a memory, an energy storage component, a motor, an integrated circuit and an electronic oscillator, etc.

Additionally, it should be noted that the main mechanical components are those of the movement and comprise, in a non-limiting and non-exhaustive manner:

- the mainspring which is the source of the mechanical force;
- the balance which oscillates and thus divides time into equal portions;
- the escapement which transforms the force of the spring into an impulse;
- the gear train which transmits the mechanical force;
- the winding stem (for manual winding) or the rotor (for automatic winding).

It is thus understood that in this configuration, this Dewar device 1 has the same properties and features as a Dewar tube/flask well known in the prior art. As mentioned hereinabove, the properties and features of this Dewar device 1 help to procure good thermal insulation in particular from the extreme temperatures that may prevail in the external environment in which such a device 1 may be located.

In this context, this device 1 thus comprises the casing 4 which includes the middle 10*c* on which a bracelet is mounted allowing a user of this device 1 to wear it. This casing 4 further includes the transparent external element, in this case the crystal 10*a* and the back 10*b* mentioned hereinabove. In this device 1, it should be noted that the crystal 10*a* preferably comprises a surface which is substantially larger or strictly larger than a crystal 11 of the case 6 of the watch 3.

As seen hereinabove, the crystal 10*a,* the middle 10*c* and the back 10*b* of this device 1 jointly define the enclosure 5 of this casing 4 which is capable of receiving the case 6 of the watch 3. These three elements 10*a* to 10*c* of the casing 4, i.e. the middle 10*c,* the crystal 10*a* and the back 10*b,* can be separate elements which are joined together to form this enclosure 5. Alternatively, the middle 10*c* and the back 10*b* of the casing 4 can jointly form a one-piece cast, said one-piece cast defining an opening opposite the back 10*b* which is capable of being closed by the crystal 10*a* in a reversible and impervious manner. In an alternative embodiment, the middle 10_c_ and the crystal 10_a_ of the case 4 of the watch 3 can jointly form a one-piece cast, said one-piece cast defining an opening opposite the crystal 10_a_ which is capable of being closed by the back 10_b_, also in a reversible and impervious manner.

The middle 10_c_ or the back 10_b_ can also be, like the crystal 10_a_, a transparent external element of the casing 4 of the Dewar device. In such a configuration, the peripheral wall 12 of the middle 10_c_ and the inner face of the back 10_b_ can be coated with a metallic or similar, reflective coating, such as a silver layer.

It should be noted, however, that the middle 10_c_ or the back 10_b_ are preferably made, in a non-limiting and non-exhaustive manner, of a metallic material or of thermosetting or thermoplastic polymer resins reinforced with carbon or glass fibres or even of ceramic materials.

Moreover, the device 1 can comprise an interferometric filter arranged on an overall external face of the casing 4, i.e. on an external peripheral wall of the middle 10_c_ and/or on the external faces of the crystal 10_a_ and the back 10_b_ of this case 6 of the watch 3. This interferometric filter can be a grid or a lattice forming a coating on this overall external face of the casing 4. This grid or lattice has a mesh whose dimensions are such that they allow only certain predetermined wavelengths of the electromagnetic spectrum to pass, typically wavelengths in the visible range. It should be noted that this grid is capable of reflecting at least one ultraviolet and/or infrared or near infrared radiation (NIR).

Moreover, when the device 1 is intended to be used in an environment containing air, the enclosure 5 of the casing 4 comprising the watch case 6 is under vacuum or near vacuum. In other words, in this enclosure, the space defined between this case 6 and the inner peripheral wall 12 of the middle 10_c_, the back 10_b_ and the crystal 10_a_ is empty or almost empty of material. It should be noted that when this device 1 is used in an airless or substantially airless environment, the enclosure thereof is not necessarily under vacuum, or conversely can also be under vacuum or near vacuum.

Thus, the external element, in this case the crystal, equipping this Dewar device 1, helps to provide the mechanical and/or functional components 2 of the watch 3 with very good thermal insulation from the external environment by reducing or even preventing heat loss by radiation from the components arranged in the watch case 6 over a long period of time. Thus, when the temperature outside the device 1 reaches extreme values, typically of the order of −125 to +125° C., the temperature inside the enclosure 5 remains substantially equal to the temperature present in the case 6 of the watch 3 when it is arranged inside the casing 4, typically of the order of 20° C. It should be noted that whatever the temperature conditions prevailing in the environment of the Dewar device 1, the temperature present in the case 6 of the watch 3 is a temperature that does not hinder the proper functioning of the watch. This temperature is maintained over a period of time which is 5 to 18 times longer than the period of time for which such a watch case would be capable of maintaining an operating temperature of its components 2 when located directly in such an environment where such extreme temperatures prevail (i.e. when located outside the casing of the Dewar device). It is thus considered that such a configuration allows the mechanical and/or functional components 2 of the watch 3 to be protected, and helps ensure that they function optimally under extreme external temperature conditions.

The invention claimed is:

1. A dewar device for mechanical and/or functional components of a watch, said device being provided with a bracelet and a casing including an enclosure in which a case of said watch is capable of being arranged and at least one fastening device fastening said case of the watch inside said enclosure of the casing while keeping said case away from a set of elements of the casing defining the enclosure, said set comprising at least one transparent external element made of a transparent polycrystalline ceramic material, and said device further comprising an interferometric filter arranged on an overall external face of the casing.

2. The dewar device according to claim 1, wherein said at least one transparent external element is made of a ceramic material containing aluminium oxynitride.

3. The dewar device according to claim 1, wherein said at least one transparent external element is made of a ceramic material containing alumina-magnesia.

4. The dewar device according to claim 1, wherein said at least one transparent external element is made of a ceramic material containing yttrium oxide.

5. The dewar device according to claim 1, wherein said at least one transparent external element is made of a ceramic material containing yttrium aluminium garnet.

6. The dewar device according to claim 1, wherein said at least one transparent external element is made by sintering a rough part, the overall shape whereof corresponds to that of said external element, said rough part being formed from a powder or a mixture of powders of ceramic material containing aluminium oxynitride, alumina-magnesia, yttrium oxide and/or yttrium aluminium garnet.

7. The dewar device according to claim 1, wherein said at least one transparent external element has a Vickers hardness number comprised between 1,223 and 1,632 kgf.mm−2.

8. The dewar device according to claim 1, wherein said at least one transparent external element has a light transmittance in the visible spectrum of 85% for a thickness of 2 mm.

9. The dewar device according to claim 1, wherein the external element has a light absorption coefficient in the visible spectrum of no more than 65% after sintering and polishing.

10. The dewar device according to claim 1, wherein said at least one transparent external element is a crystal whose surface is larger or strictly larger than a crystal of the case of the watch.

11. The dewar device according to claim 1, wherein a crystal of the case of the watch is disposed facing a crystal of the casing when the case of the watch is arranged in said enclosure.

12. The dewar device according to claim 1, wherein said enclosure is under vacuum.

13. The dewar device according to claim 1, wherein the at least one fastening device is arranged on an inner peripheral wall of the enclosure of the casing.

* * * * *